(12) United States Patent
Wagenvoort et al.

(10) Patent No.: US 10,233,966 B2
(45) Date of Patent: Mar. 19, 2019

(54) METHOD OF ASSEMBLING AND AN ASSEMBLY OF A CRANKSHAFT AND A CRANK MEMBER

(71) Applicant: Gomecsys B.V., Naarden (NL)

(72) Inventors: Willem-Constant Wagenvoort, Huizen (NL); Sander Wagenaar, Huizen (NL); Lambertus Hendrik De Gooijer, Naarden (NL)

(73) Assignee: GOMECSYS B.V., Naarden (NL)

( * ) Notice: Subject to any disclaimer, the term of this patent is extended or adjusted under 35 U.S.C. 154(b) by 0 days.

(21) Appl. No.: 15/035,719

(22) PCT Filed: Nov. 12, 2014

(86) PCT No.: PCT/EP2014/074358
§ 371 (c)(1),
(2) Date: May 10, 2016

(87) PCT Pub. No.: WO2015/071297
PCT Pub. Date: May 21, 2015

(65) Prior Publication Data
US 2016/0258475 A1    Sep. 8, 2016

(30) Foreign Application Priority Data

Nov. 13, 2013 (EP) .................................. 13192653
Nov. 19, 2013 (EP) .................................. 13193563

(51) Int. Cl.
*F16C 17/02* (2006.01)
*F16C 3/10* (2006.01)
(Continued)

(52) U.S. Cl.
CPC .............. *F16C 3/10* (2013.01); *F02B 75/048* (2013.01); *F02B 75/32* (2013.01); *F16C 3/06* (2013.01)

(58) Field of Classification Search
CPC .......... F16C 2360/22; F16C 3/06–3/08; F16C 17/022; F16C 33/046; F16C 23/10;
(Continued)

(56) References Cited

U.S. PATENT DOCUMENTS 460,642 A    10/1891 Kitson
1,207,429 A  12/1916 Morison
(Continued)

FOREIGN PATENT DOCUMENTS

AU    7857681 A    6/1982
CN    1176678 A    3/1998
(Continued)

OTHER PUBLICATIONS

English translation of DE10230425.*
(Continued)

*Primary Examiner* — Jun S Yoo
(74) *Attorney, Agent, or Firm* — Steven M. Koehler; Westman, Champlin, Koehler P.A.

(57) ABSTRACT

A method of assembling a crankshaft and a crank member comprises supplying a crankshaft including a crankpin which extends between crank arms, supplying two halves of a crank member, which are fixed to each other about the crankpin such that in assembled condition the crank member is rotatable about the crankpin and comprises a bearing portion having an outer circumferential wall for bearing a big end of a connecting rod and an external crank member gear for driving the crank member about the crankpin, wherein the halves are fitted about the crankpin, hence creating two contact faces at opposite sides of the crankpin, after which both halves are fixed to each other in circumferential direction by means of applying at least a fixation at a fixing place located remote from the bearing portion and the toothed surface of the crank member gear.

10 Claims, 16 Drawing Sheets

(51) Int. Cl.
*F02B 75/04* (2006.01)
*F02B 75/32* (2006.01)
*F16C 3/06* (2006.01)

(58) Field of Classification Search
CPC .... F16C 3/18; F16C 3/28; F02B 75/32; F02F 7/0053; F04B 53/006; F04B 9/045; F01L 2001/0471–2001/0473; F01L 2001/047
See application file for complete search history.

(56) References Cited

U.S. PATENT DOCUMENTS

| | | | |
|---|---|---|---|
| 1,553,009 A | | 9/1925 | Stuke |
| 1,767,352 A | | 6/1930 | Damblanc |
| 1,964,096 A | | 6/1934 | Tucker |
| 2,271,766 A | | 2/1942 | Chio |
| 2,369,747 A | | 2/1945 | Munn |
| 3,686,972 A | | 8/1972 | McWhorter |
| 3,861,239 A | | 1/1975 | McWhorter |
| 3,886,805 A | | 6/1975 | Koderrnan |
| 4,073,196 A | | 2/1978 | Dell |
| 4,152,955 A | | 5/1979 | McWhorter |
| 4,179,942 A | | 12/1979 | Matthews |
| 4,237,741 A | | 12/1980 | Huf |
| 4,860,702 A | | 8/1989 | Doundoulakis |
| 5,133,314 A | | 7/1992 | Langstroth |
| 5,170,757 A | | 12/1992 | Gamache |
| 5,265,566 A | * | 11/1993 | Arnold .................... F02F 11/007 123/197.4 |
| 5,482,015 A | | 1/1996 | Fish |
| 5,605,120 A | | 2/1997 | Hedelln |
| 5,611,301 A | | 3/1997 | Bergsten |
| 5,908,014 A | | 6/1999 | Leithinger |
| 5,927,236 A | | 7/1999 | Gonzalez |
| 6,273,052 B1 | | 8/2001 | Bresland |
| 6,349,684 B1 | | 2/2002 | De Gooijer |
| 6,453,869 B1 | | 9/2002 | de Gooijer |
| 6,857,412 B2 | | 2/2005 | Ozdamar |
| 7,011,052 B2 | | 3/2006 | de Gooijer |
| 7,293,542 B2 | | 11/2007 | Ozdarnar |
| 9,279,363 B2 | | 3/2016 | De Gooijer |
| 2003/0183026 A1 | | 10/2003 | Alexander |
| 2006/0053964 A1 | | 3/2006 | Venettozzi |
| 2009/0133653 A1 | | 5/2009 | Duzzie |
| 2009/0188337 A1 | | 7/2009 | Chio |
| 2011/0036334 A1 | | 2/2011 | De Gooijer |
| 2012/0180583 A1 | | 7/2012 | De Gooijer |
| 2014/0360292 A1 | | 12/2014 | De Gooijer |

FOREIGN PATENT DOCUMENTS

| | | |
|---|---|---|
| CN | 102066719 A | 5/2011 |
| DE | 181913 | 3/1905 |
| DE | 164819 C | 11/1905 |
| DE | 329861 C | 12/1920 |
| DE | 458059 C | 12/1929 |
| DE | 2947882 A1 | 7/1981 |
| DE | 24077 A | 1/1987 |
| DE | 3634536 A1 | 2/1987 |
| DE | 3642681 A1 | 6/1988 |
| DE | 10230425 A1 | 1/2004 |
| DE | 10230426 A1 | 1/2004 |
| DE | 102011085647 A1 | 5/2013 |
| EP | 0184042 A2 | 6/1986 |
| EP | 0345366 A1 | 12/1989 |
| EP | 1959112 A1 | 8/2008 |
| EP | 2025893 A1 | 2/2009 |
| EP | 2620614 A1 | 7/2013 |
| FR | 636243 A | 4/1928 |
| FR | 861611 A | 2/1941 |
| FR | 986605 A | 8/1951 |
| FR | 1014314 A | 8/1952 |
| FR | 2680402 A1 | 2/1993 |
| GB | 150291 A | 11/1921 |
| GB | 173252 A | 12/1921 |
| GB | 1094649 A | 12/1967 |
| GB | 2258271 A | 2/1993 |
| JP | S49-6364 A | 1/1974 |
| JP | S54124949 A | 9/1979 |
| JP | 6113276 | 6/1986 |
| JP | 61187931 | 11/1986 |
| JP | H01122161 A | 5/1989 |
| JP | 361135 | 3/1991 |
| JP | H04-22717 A | 1/1992 |
| JP | 10121981 | 10/1996 |
| JP | H11506511 A | 6/1999 |
| JP | 2002286020 | 10/2002 |
| JP | 2007113471 A | 5/2007 |
| JP | 200936030 | 2/2009 |
| JP | 2012533021 A | 12/2012 |
| WO | 8607115 A1 | 12/1986 |
| WO | 9627079 A1 | 9/1996 |
| WO | 9745647 A1 | 12/1997 |
| WO | 9963247 A1 | 12/1999 |
| WO | 02/059503 A1 | 8/2002 |
| WO | 03/098005 A1 | 11/2003 |
| WO | 2006004612 A2 | 1/2006 |
| WO | 2008129025 A1 | 10/2008 |
| WO | 2009018863 A1 | 2/2009 |
| WO | 2009100759 A1 | 8/2009 |
| WO | 2011006537 A1 | 1/2011 |
| WO | 2013110700 A1 | 8/2013 |
| WO | 20130160501 A1 | 10/2013 |

OTHER PUBLICATIONS

International Search Report and Written Opinion for corresponding International patent application No. PCT/EP2014/074358.
Chinese Office Action dated Feb. 23, 2018, for corresponding Chinese Patent Application No. 201480061585.6, filed Nov. 12, 2014.
Japanese Office Action dated Sep. 10, 2018, for corresponding Japanese Patent Application No. 2016-528859, filed Sep. 15, 2016.

\* cited by examiner

METHOD OF ASSEMBLING AND AN ASSEMBLY OF A CRANKSHAFT AND A CRANK MEMBER

CROSS-REFERENCE TO RELATED APPLICATION

This application is a Section 371 National Stage Application of International Application PCT/EP2014/074358 filed Nov. 12, 2014 and published as WO2015/071297A1 in English.

BACKGROUND

The discussion below is merely provided for general background information and is not intended to be used as an aid in determining the scope of the claimed subject matter.

The present invention relates to a method of assembling a crankshaft and a crank member.

An earlier application WO 2013/110700 of the applicant discloses a reciprocating piston mechanism which is provided with a crankshaft and a crank member that is rotatable about the crankpin of the crankshaft. The prior art crankshaft is composed of separate parts and the crank member is mounted on the crankpin as a single part. From manufacturing point of view it is desired to use a crankshaft as single part and compose the crank member of two halves.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The present invention aims to provide an improved method of assembling a crankshaft and a crank member.

For this purpose the method according to the invention comprises the steps as defined in claim 1.

An advantage of this method is that it is not necessary to fix the halves to each other in circumferential direction at the bearing portion and the toothed surface of the crank member gear. This could lead to undesired deviations of the bearing portion surface and the toothed surface upon assembly such that a mechanical after treatment might be required, for example. Nevertheless, the halves may be fixed to each other in axial and/or radial direction of the crankpin axis upon the step of fitting, for example by means of centring elements at the contact faces.

In assembled condition the inner wall of the crank member may be cylindrical and fit accurately to the outer wall of the crankpin. The contact faces between the halves may extend parallel to each other at opposite sides of the crankpin and may lie in a common plane. The bearing portion may be adjacent to the crank member gear in axial direction and located such that in assembled condition the crank member gear is disposed between the bearing portion and the crank arm. If the crank member is provided with two crank member gears, the bearing portion may be located between the crank member gears in axial direction. The opposite axial outer sides of the crank member may be formed by parallel surfaces, for example opposite side walls of the crank member gears if the crank member has two crank member gears at opposite sides of the crank member.

Preferably the fixing place is located at an axial outer side of the crank member at at least one contact face between the halves, since any fixation at radial circumference of the crank member can be omitted. The axial outer side may be formed by an outer surface of the crank member gear.

In a practical embodiment the crank member has four fixing places for keeping both halves together: two fixing places at each of the opposite axial outer sides, located at the contact faces.

The rotational position of the crank member with respect to the crankpin may be selected such that the fixing place lies beyond the adjacent crank arm as seen in radial direction from the crankpin axis before applying the fixation. This facilitates access to the fixing place, for example for a tool to apply the fixation.

The fixing place may substantially lie in a plane through the crankshaft axis and the crankpin axis. This allows to easily reach the fixing place if an end portion of the crank arm, as seen in radial direction from the crankshaft axis, is levelled, such that the fixing place lies beyond the radial end thereof.

The applied fixation may comprise welding of the halves at the fixing place.

Alternatively, the applied fixation may comprise the step of inserting a locking member into recesses which are present in the halves at the fixing place. The recesses form a common recess in which the locking member can be inserted. The locking member may be I-shaped, which provides a simple shape to keep the halves of the crank member together.

The locking member and the recesses may be shaped such that the locking member is inserted by means of pressing, causing the halves to be pressed to each other at the same time. This can be achieved by tapered locking members and complementary recesses, for example. Alternatively, the locking member is inserted into the recesses and shrinked, for example in case of a heat assembly.

After applying the fixation at the fixing place the crank member can be rotated about the crankpin such that the other contact face at the axial outer side of the crank member lies beyond the adjacent crank arm in radial direction as seen from the crankpin axis, after which a second fixation is applied at the other contact face at the axial outer side of the crank member.

Due to manufacturing tolerances the dimensions of the recesses in the crank member halves may vary in practice. In order to compensate for such deviations, and/or to create a consistent clamping force between the halves in case of tapered locking members and recesses, an intermediate step in the method of assembling may be applied. Before the step of inserting the locking member the dimensions of the recesses may be determined, wherein a complementary locking member is selected out of a series of locking members having different dimensions, wherein the selection is based on a predetermined desired relationship between dimensions of the recesses and the locking members. The dimensions of the recesses may be determined by a contact or non-contact measuring device, for example a laser measuring device. Preferably, the dimensions are determined after fitting the halves to each other such that the dimensions of the common recess for receiving the locking member is measured. During assembling an operator or a device can select a complementary locking member out of a series of locking members of different dimensions. The relationship between dimensions of the recesses and the locking members may be a simple list containing ranges of dimensions of the recesses and a corresponding locking member size for each range.

Alternatively, the axial outer side of the crank member may have two fixing places at the opposite contact faces, such that the fixing places are located at opposite sides of the crankpin, whereas the adjacent crank arm is shaped such that at a certain rotational position of the crank member with respect to the crankpin both fixing places lie beyond the adjacent crank arm. This is advantageous since two fixations can be applied at two fixing places at one axial outer side simultaneously.

The fixing place may be located at an axial side of the crank member, located between the bearing portion and the toothed surface of the crank member gear, wherein the applied fixation preferably comprises welding. For example, the axial outer side of the crank member may be formed by a front surface of the crank member gear and the fixing place may be located at the opposite rear surface of the crank member gear. Alternatively, a flange may be located between the bearing portion and the crank member gear, whereas the fixing place is located at the side of the flange which is directed opposite to the normal to the front surface of the crank member gear.

Alternatively, the fixing place may be located between the bearing portion and the toothed surface of the crank member gear. In this case the applied fixation may comprise a circular locking member or a clamp about the halves. Numerous possibilities of fixing the clamp are conceivable. The clamp may comprise two halves of a circular flange which are fitted between the bearing portion and the crank member gear after fitting both halves of the crank member about the crankpin. After fitting the flange halves to each other about the crank member halves they can be fixed to each other by means of welding, for example. A welding location may be located at a rotational distance from the contact faces, for example at 90° from the contact faces, and at the front and/or rear side of the flange.

The invention is also related to an assembly of a crankshaft and a crank member. The assembly may also be the product obtained by the method as described hereinbefore. The assembly is suitable for use in a reciprocating piston mechanism, for example in an internal combustion engine with variable compression ratio. Therefore, the bearing portion may be eccentrical with respect to the crankpin.

In a specific embodiment the crank member gear is a rear crank member gear and the fixing place is located at the rear crank member gear, wherein the crank member comprises a front external crank member gear located at an opposite end of the crank member with respect to the rear crank member gear and having a smaller diameter than the rear crank member gear, wherein a flange is mounted between the front external crank member gear and the bearing portion, wherein the flange is formed by two parts that are each integrated in the halves of the crank member and fixed to each other in circumferential direction at both contact faces thereof. In this case the surface of the outer axial side of the front crank member gear may provide too little space for a fixation. In order to fix the crank member halves to each other in circumferential direction at the front crank member gear, fixations are applied at the flange, either in radial direction or in axial direction thereof.

BRIEF DESCRIPTION OF THE DRAWINGS

Aspects of the invention will hereafter be elucidated with reference to the schematic drawings showing embodiments of the invention by way of example.

DETAILED DESCRIPTION

Figure 1:
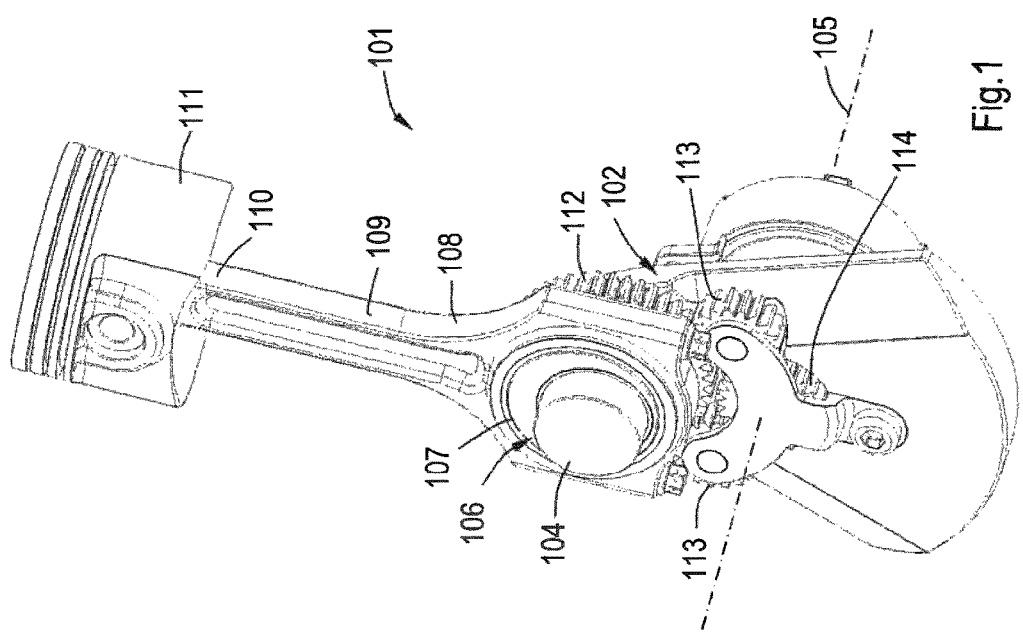
FIGS. 1 and 2 are perspective views from different sides and at different scales of a reciprocating piston mechanism according to the prior art.
Figure 2:
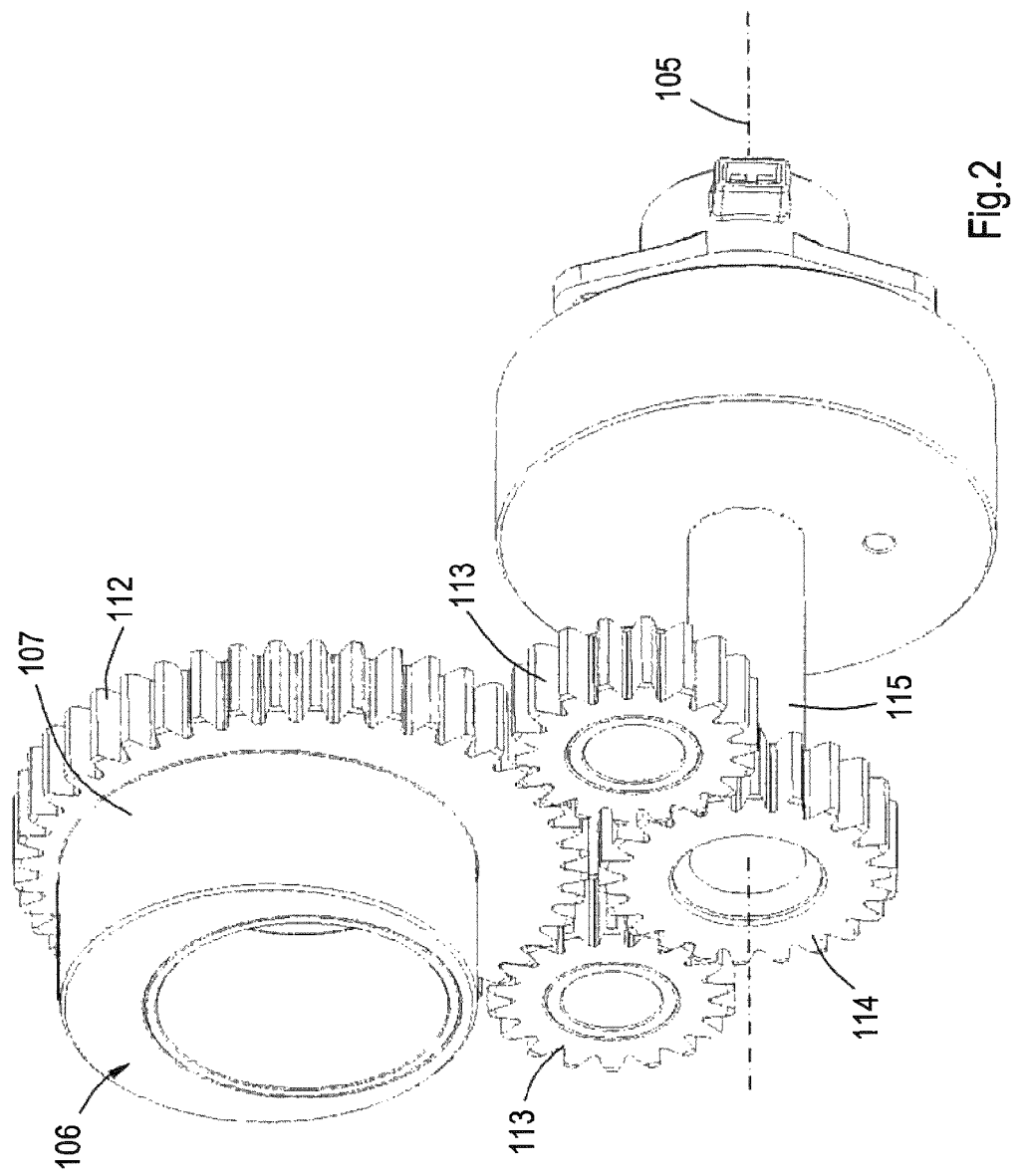

FIGS. 1 and 2 show different sides of a part of a prior art reciprocating piston mechanism 101 as disclosed in WO 2013/110700. The reciprocating piston mechanism 101 is suitable for an internal combustion engine having variable compression ratio. The reciprocating piston mechanism 101 comprises a crankcase, which supports a crankshaft 102. The crankshaft 102 includes a crankpin 104 and is rotatable with respect to the crankcase about a crankshaft axis 105.

The reciprocating piston mechanism 101 comprises a crank member 106 which is rotatably mounted on the crankpin 104. The crank member 106 is provided with a bearing portion 107 which is disposed eccentrically with respect to the crankpin 104, see FIG. 2. The bearing portion 107 has an outer circumferential wall which bears a big end 108 of a connecting rod 109. Thus, the connecting rod 109 is rotatably mounted on the crank member 106 via its big end 108. The connecting rod 109 also includes a small end 110 to which a piston 111 is rotatably connected. It is noted that in FIG. 2 the crankshaft 102 and connecting rod 109 are not shown for clarity reasons.

The crank member 106 is provided with an external crank member gear 112 for driving the crank member 106. The crank member gear 112 meshes with two intermediate gears 113. The intermediate gears 113 are rotatably mounted to the crankshaft 102 and their axes of rotation extend parallel to the crankshaft axis 105. Each of the intermediate gears 113 also meshes with an auxiliary gear 114. The auxiliary gear 114 is fixed to an auxiliary shaft 115. The auxiliary shaft 115 extends concentrically through the crankshaft 102 and is rotatable with respect to the crankshaft 102 about the crankshaft axis 105. Thus, the auxiliary shaft 115 is rotatable about an auxiliary shaft axis which substantially coincides with the crankshaft axis 105. As a consequence, the centre line of the auxiliary gear 114 coincides with the crankshaft axis 105.

The gear dimensions can be selected such that under operating conditions the crank member 106 rotates in the same direction as the crankshaft 102 and at half speed thereof, as seen from the crankcase, when the auxiliary shaft 115 is hold at a constant angular position with respect to the crankcase. The angular position of the auxiliary shaft 115 may be changed so as to modify the actual compression ratio of the mechanism.

In the mechanism as shown in FIGS. 1 and 2 the crankshaft 102 is assembled from separate parts. The crank member 106 is mounted as a single part on the crankpin 104 after which the crankpin 104 is attached to the rest of the crankshaft 102 by means of a press connection.

The present invention is related to a different method of assembling a crankshaft and a crank member, wherein two halves of a crank member are mounted about a crankpin.

Figure 3:
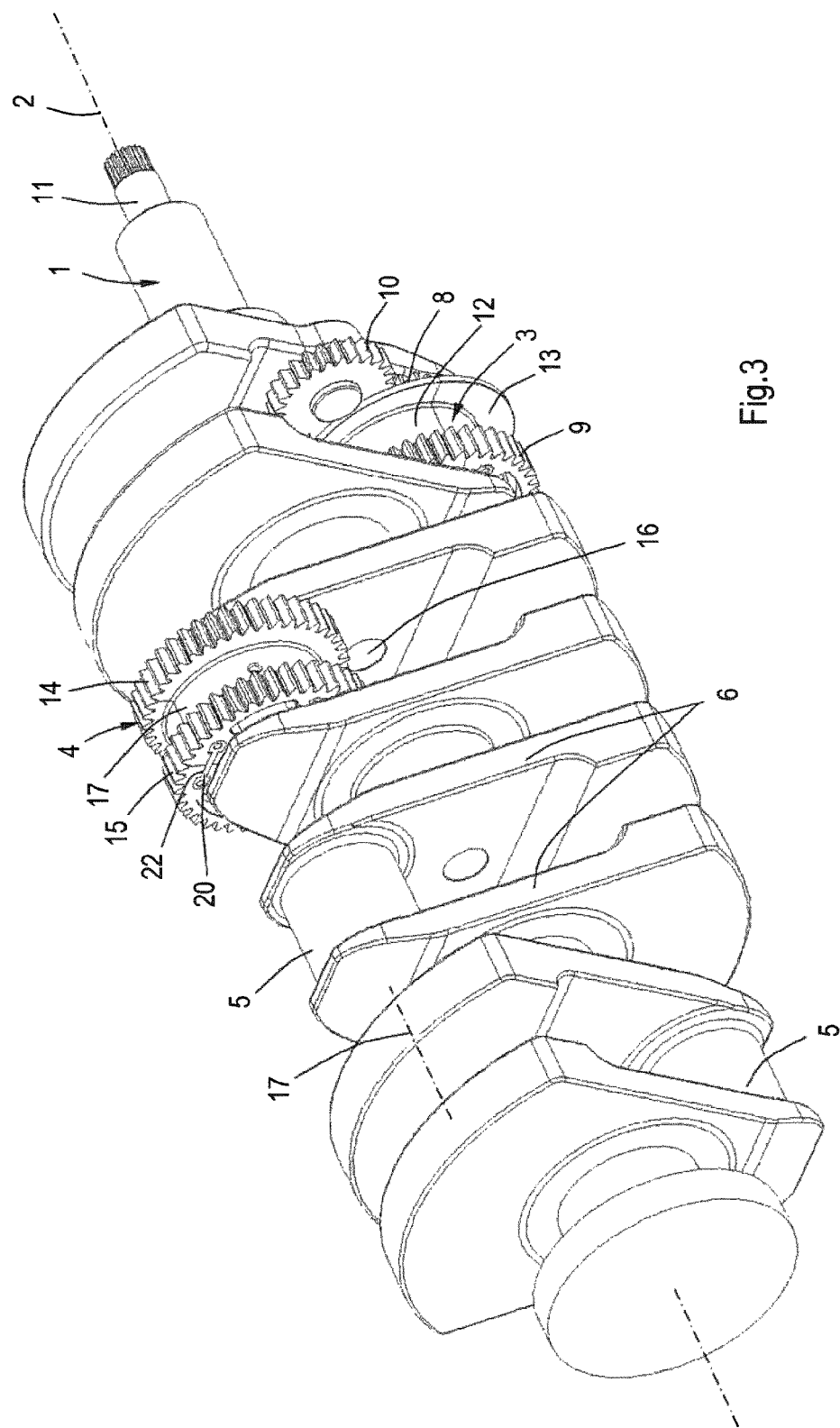
FIG. 3 is a perspective view of a partly assembled crankshaft and two crank members according to an embodiment of the invention.

FIG. 3 shows an embodiment of an assembly of a crankshaft 1 including a crankshaft axis 2 and two different crank members: a first crank member 3 and a second crank member 4. The crankshaft 1 and the first and second crank members 3, 4 are assembled by means of an embodiment of the method according to the invention. The embodiment of the crankshaft 1 is provided with four crankpins 5, each extending between crank arms 6. The assembly is suitable for a reciprocating piston mechanism with four pistons, for example for a four-cylinder internal combustion engine. Nevertheless, the method of assembling is applicable for all kinds of crankshafts with different number of crankpins. FIG. 3 shows that the first and second crank members 3, 4 are mounted about the associated crankpins 5, whereas two remaining crankpins 5 are still free from crank members. In a fully assembled condition the other two crankpins 5 may be provided with identical further second crank members 4. Each of the crankpins 5 has a crankpin axis 7 which extends parallel to the crankshaft axis 2.

The first crank member 3 has an external front crank member gear 8 and an external rear crank member gear 9. The front crank member gear 8 meshes with intermediate gears 10, similar to the prior art mechanism as shown in FIGS. 1 and 2. The intermediate gears 10 mesh with an auxiliary gear (not shown) which is fixed to an auxiliary shaft 11. The auxiliary shaft 11 extends concentrically through the crankshaft 1 and is rotatable with respect to the crankshaft 1 about the crankshaft axis 2. Thus, the auxiliary shaft 11 is rotatable about an auxiliary shaft axis which substantially coincides with the crankshaft axis 2.

The first crank member 3 comprises a bearing portion 12 which has an outer circumferential wall for bearing a big end of a connecting rod (not shown). The bearing portion 12 extends between the front and rear crank member gears 8, 9. Furthermore, the first crank member 3 is provided with a circular flange 13 which is located between the front crank member gear 8 and the bearing portion 12. The centre line of the flange 13 coincides with the crankpin axis 7 of the corresponding crankpin 5 to which the first crank member 3 is mounted.

The second crank member 4 also has an external front crank member gear 14 and an external rear crank member gear 15. In an entirely assembled product the front crank member gear 14 of the second crank member 4 is coupled to the rear crank member gear 9 of the first crank member 3 via a shaft (not shown) extending through a hole 16 in the centre of the crankshaft 1. Both ends of the shaft comprise auxiliary gears (not shown) which mesh with the front crank member gear 14 of the second crank member 4 and the rear crank member gear 9 of the first crank member 3, respectively. Due to this coupling the first and second crank member 3, 4, and also further crank members, rotate in a similar manner as the first crank member 3 upon rotating the crankshaft 1.

The second crank member 4 also comprises a bearing portion 17 which has an outer circumferential wall for bearing a big end of a connecting rod. The bearing portion 17 extends between the front and rear crank member gears 14, 15.

The bearing portions 12, 17 are disposed eccentrically with respect to their associated crankpins 5, such that the assembled product can be used for an internal combustion engine having variable compression ratio.

Figure 4:
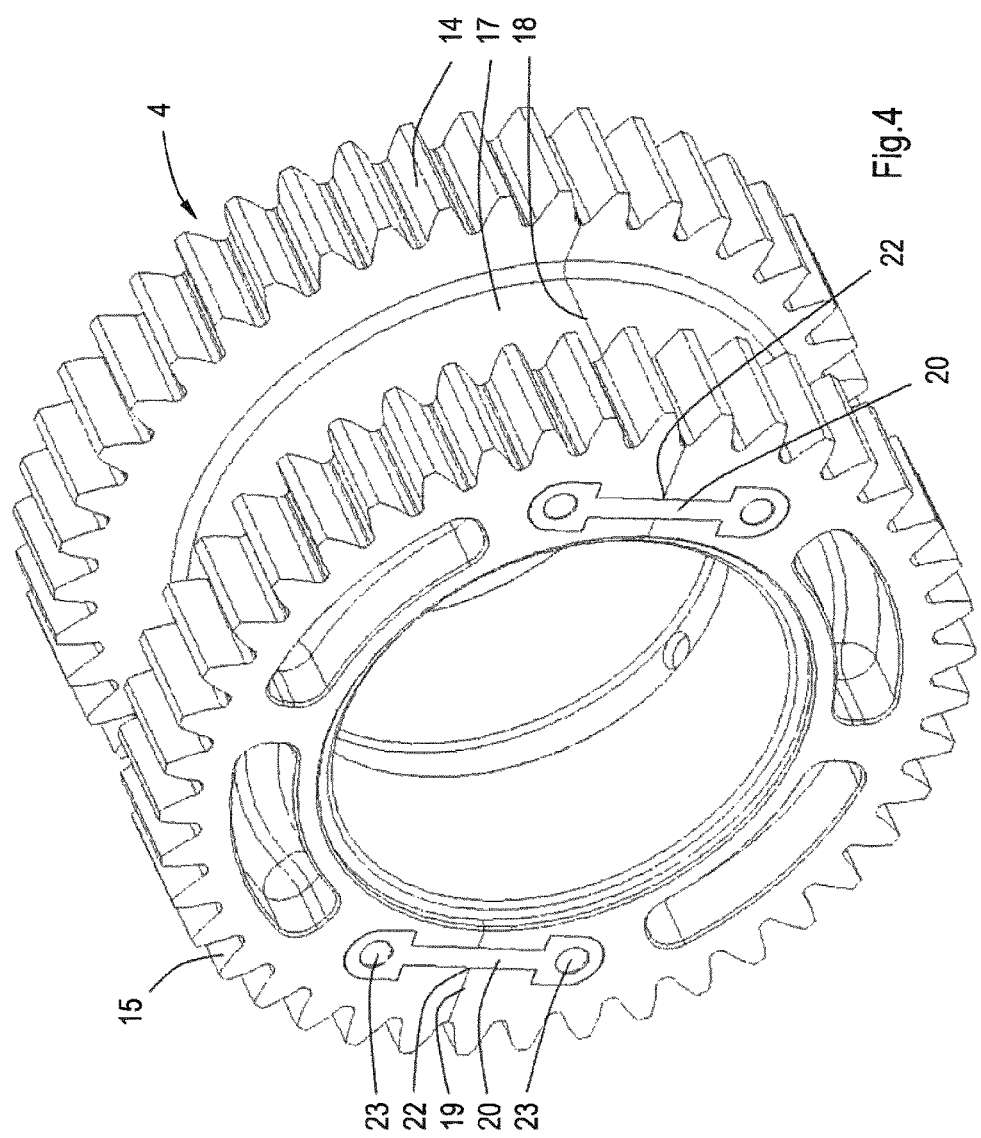
FIG. 4 is a similar view as FIG. 3, but showing an enlarged part of the second crank member.
Figure 5:
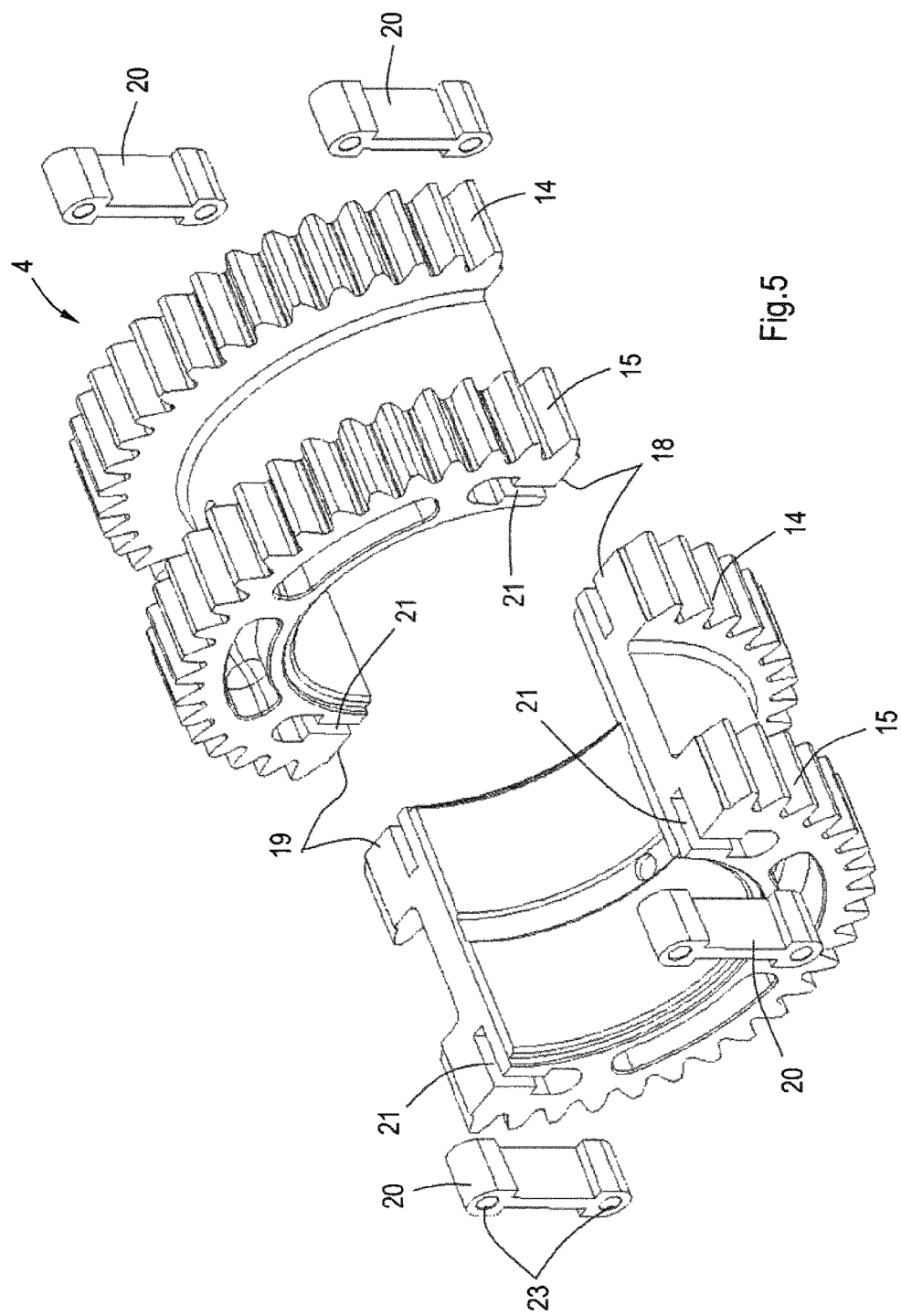
FIG. 5 is an exploded view of the second crank member as shown in FIG. 4.

FIG. 4 shows the second crank member 4 in more detail and FIG. 5 shows the second crank member 4 before assembling. In the condition as shown in FIG. 5 there are two halves of the second crank member 4. The interiors of the halves are formed by substantially semi-cylindrical walls which cooperate with the outer surface of the crankpin 5. Upon assembly of the crankshaft 1 and the second crank member 4 both halves are fit to each other about the crankpin 5. Consequently, two contact faces 18, 19 between the halves are created at opposite sides of the crankpin 5. The contact faces 18, 19 extend between opposite axial outer sides of the second crank member 4, in this case between a front surface of the front crank member gear 14 and a rear surface of the rear crank member gear 15. The contact faces 18, 19 lie in a common flat plane in this embodiment. The halves may be provided with centring elements (not shown) at the contact faces 18, 19 in order to facilitate fitting the halves to each other. The centring element may be shaped such that the halves are locked with respect to each other in axial and radial direction of the crankpin 5 when fitted onto each other, for example protrusions and complementary recesses at the contact faces 18, 19. The centring elements may also be used during manufacturing the halves of the crank members 3, 4. For example, the crank members 3, 4 may be fitted to each other by means of the centring elements during machining the bearing portions 12, 17 and/or the front and rear crank member gears 14, 15.

In the embodiment as shown in FIGS. 4 and 5 the halves are fixed to each other in circumferential direction of the second crank member 4 by means of fixations in the form of I-shaped locking members 20. The locking members 20 are inserted into complementary recesses 21 in the halves during assembling. After fitting the halves about the crankpin 5 the recesses 21 form four common recesses at four fixing places 22. Two fixing places 22 are indicated in FIG. 4. In this embodiment the fixing places 22 are located at the contact faces 18, 19 at axial outer sides of the second crank member 4. In other words, the fixing places 22 are located remote from the bearing portion 17 and the toothed surfaces of the front and rear crank member gears 14, 15. The halves are not fixed to each other in circumferential direction at the bearing portion 17 and the toothed surfaces of the front and rear crank member gears 14, 15, although centring elements may be present at the contact faces 18, 19.

An advantage of applying an I-shaped locking member 20 is that it fixes the halves in circumferential direction. It is noted that in this embodiment the axial outer sides of the second crank member 4 are formed by side walls of the front and rear crank member gears 14, 15 thereof. The halves of the front and rear crank member gears 14, 15 are integral with the respective remainders of the halves of the second crank member 4.

Since the I-shaped locking members 20 are inserted into the recesses 21 in axial direction of the crankshaft 1 there needs to be space next to the fixing places 22 in a direction along the crankpin axis 7. Special attention may be paid to the shape of the crank arms 6 and/or the method of assembling. In the condition as shown in FIG. 3 the rotational position of the second crank member 4 with respect to the crankpin 5 is selected such that the fixing place 22 at the rear surface of the rear crank member gear 15 lies beyond the adjacent crank arm 6 as seen in radial direction of the crankpin axis 7. This provides the opportunity to insert the locking member 20 into the associated adjacent common recess of the halves of the crank member 4. In this embodiment the fixing place 22 substantially lies in a plane within which both the crankshaft axis 2 and the crankpin axis 7 extend.

Similarly, at the front surface of the front crank member gear 14 a locking member 20 can be inserted into the cooperating common recess, possibly simultaneously with the locking member 20 at the rear surface of the rear crank member gear 15. After the locking members 20 have been inserted in the recesses 21 at opposite ends of the second crank member 4 at one contact face 18, the second crank member 4 can be rotated about the crankpin 5 until the other fixing places 22 or recesses 21 are located beyond the crank arms 6. It is noted that in this embodiment the adjacent crank arms 6 are levelled beyond the crankpin 5 as seen from the crankpin axis 7 so as to provide the desired space to insert the locking members 20 in axial direction into the halves of the second crank member 4.

The I-shaped locking members 20 and the complementary recesses 21 are tapered such that the locking members 20 are inserted by means of pressing whereas the halves of the crank member 4 are pressed to each other at the same time. Furthermore, the locking members 20 are provided with threaded holes 23. This provides the opportunity to engage the locking member 20 with a tool for pulling it out of the recesses 21 in case of disassembling. The threaded holes may be used to fix a hydraulic press tool to the locking member, such that a fluid can be pressed through the locking member into the common recess in order to press the locking member out of the common recess.

It is noted that the locking member may also be inserted and fixed into the common recess by means of shrinkage fit or a heat assembly.

Figure 6:
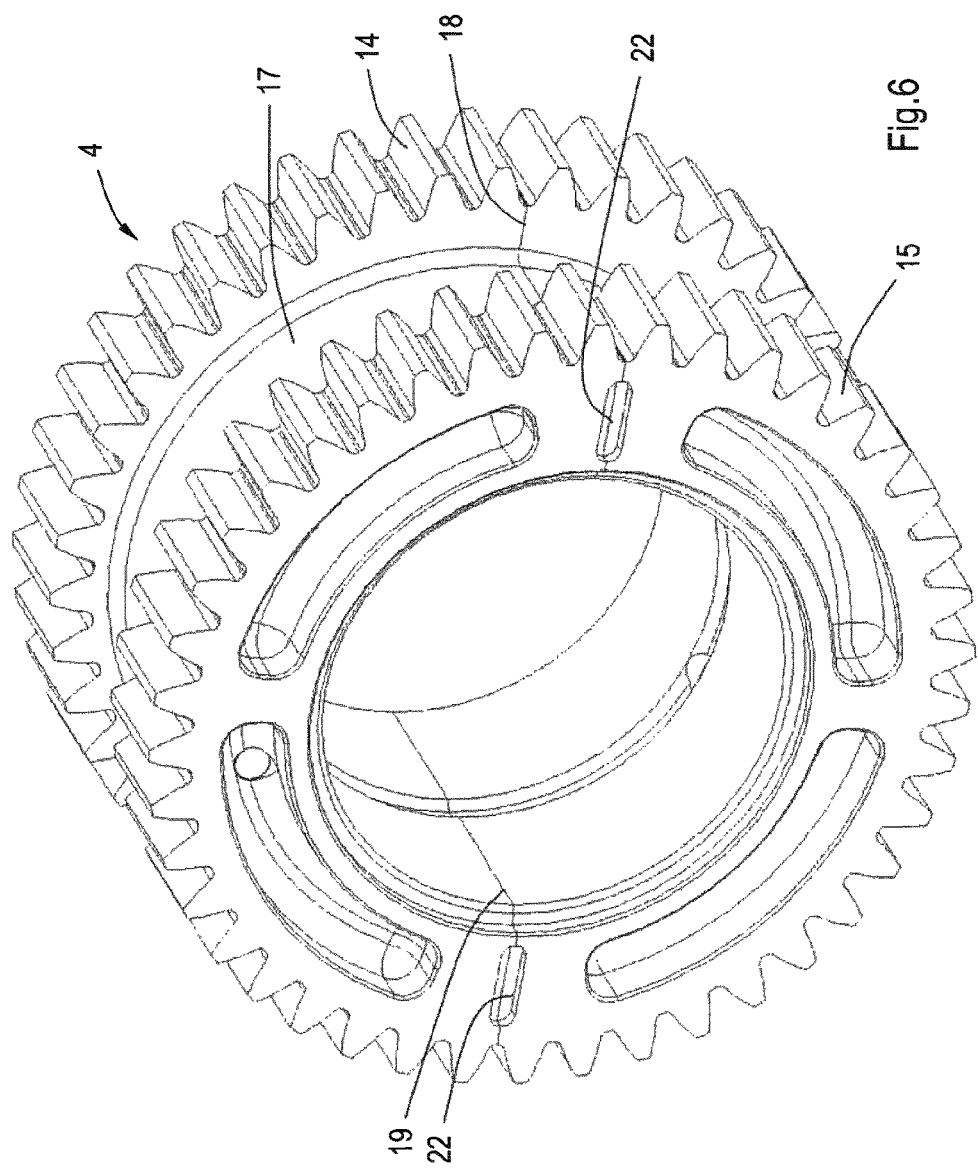
FIGS. 6 and 7 are similar views as FIG. 4, but showing an alternative embodiment of the second crank member.

FIG. 6 shows an alternative embodiment of the second crank member 4. This embodiment is more or less similar as the embodiment as shown in FIGS. 4 and 5 regarding the front and rear crank member gears 14, 15, the bearing portion 17 and the two contact faces 18, 19 between the halves of the assembled crank member 4. When the halves are fitted to each other there are two fixing places 22 located at the contact faces 18, 19 at each of the axial outer sides of the second crank member 4. In this case the applied fixation comprises welding of the halves at the fixing places 22. In order to avoid local protrusions of welding seams, recesses are present at the fixing places 22. The welding seams may fill the respective recesses. Unlike the embodiment as shown in FIGS. 4 and 5, disassembling the crank member 4 afterwards is less easy or even impossible without damaging the second crank member 4.

Figure 7:
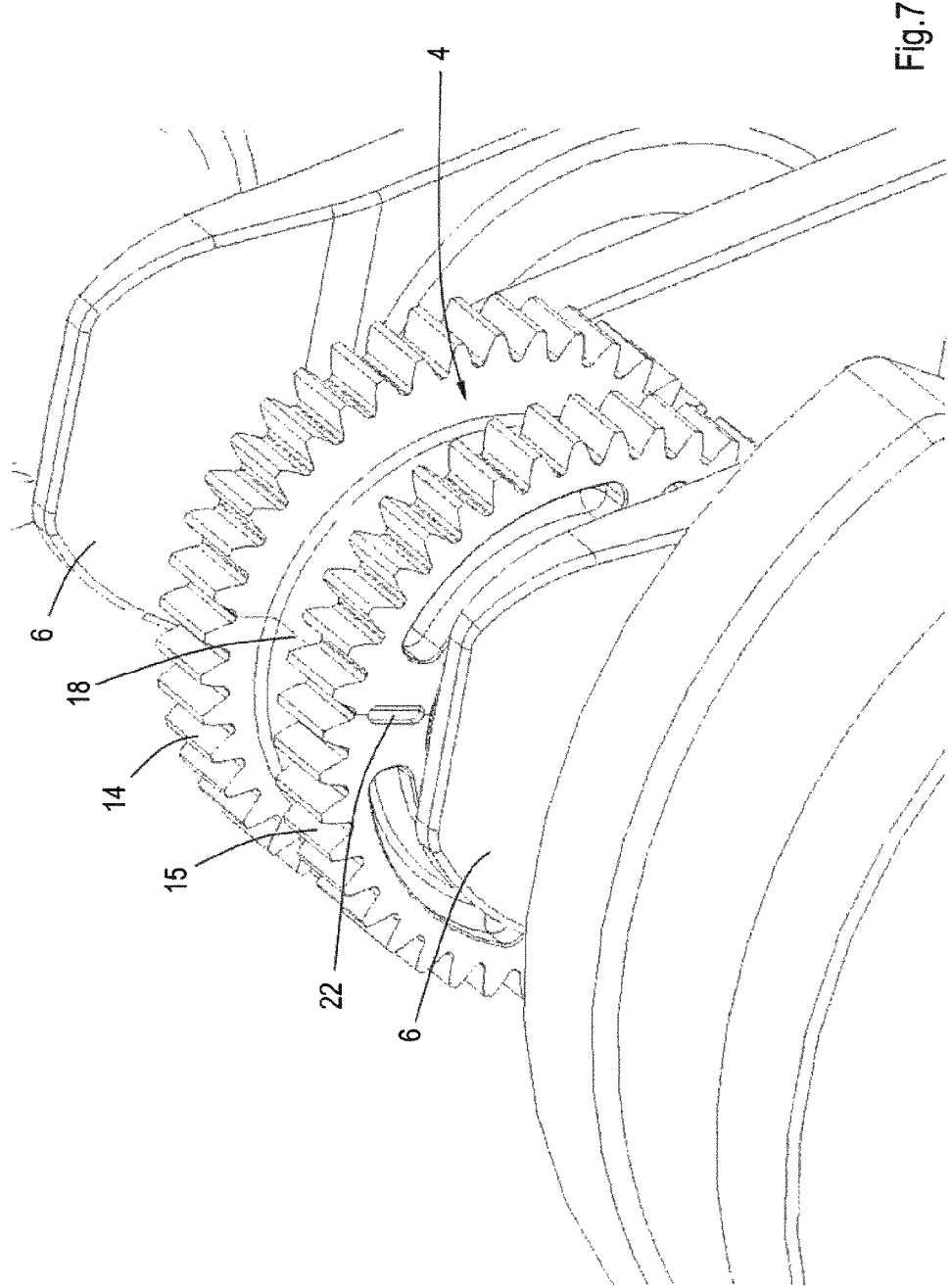

FIG. 7 illustrates that the method of assembling may be performed in a similar way as described before. The second crank member 4 can be rotated about the crankpin 5 until the other fixing places 22 are located beyond the respective adjacent crank arms 6. This provides space in axial direction of the fixing places 22 for placing a welding tool. It is noted that the fixing places 22 may also be located at opposite sides of the front and rear crank member gears 14, 15, i.e. at the rear surface of the front crank member gear 14 and/or at the front surface of the rear crank member gear 15.

Figure 8:
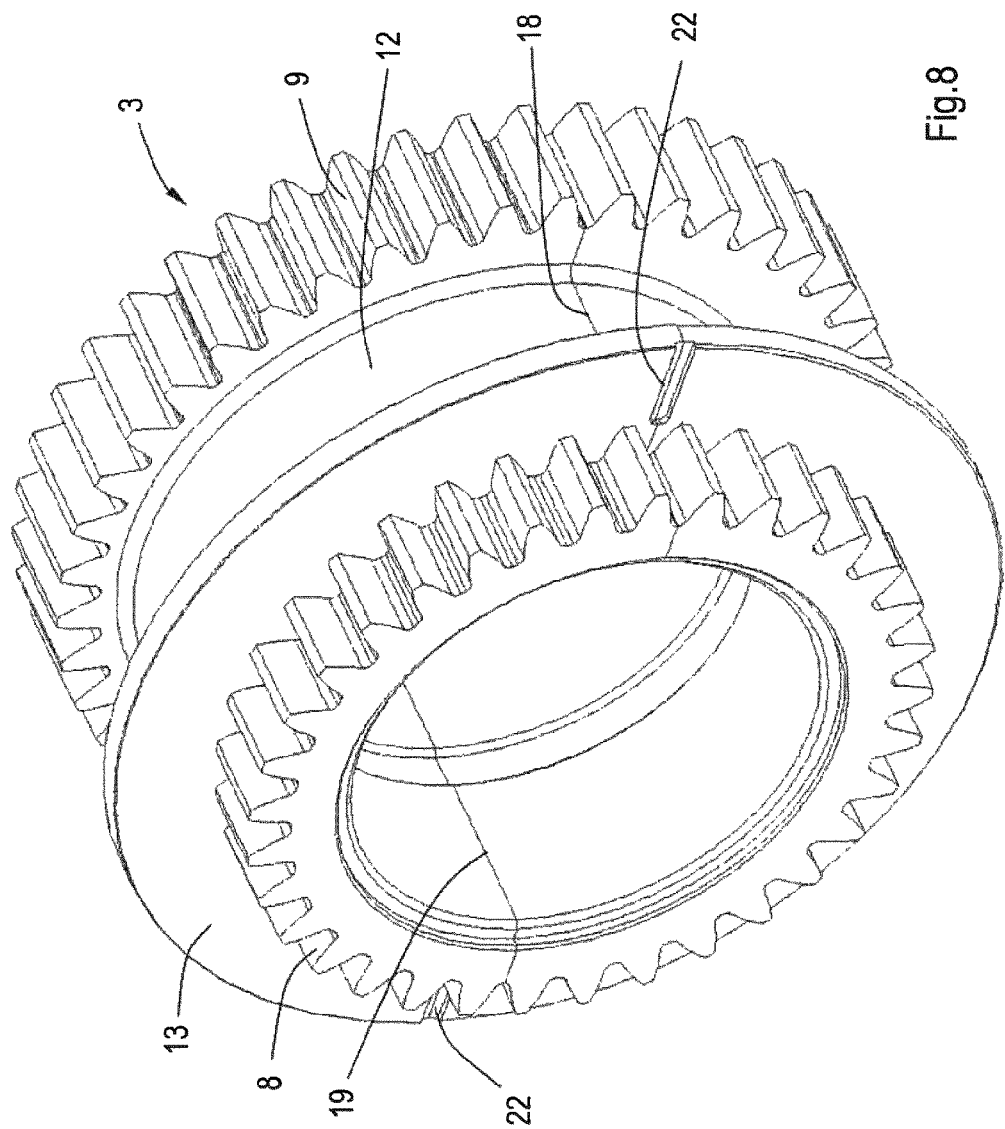
FIGS. 8 and 9 are similar views as FIGS. 4 and 5, respectively, but showing an embodiment of the first crank member.
Figure 9:
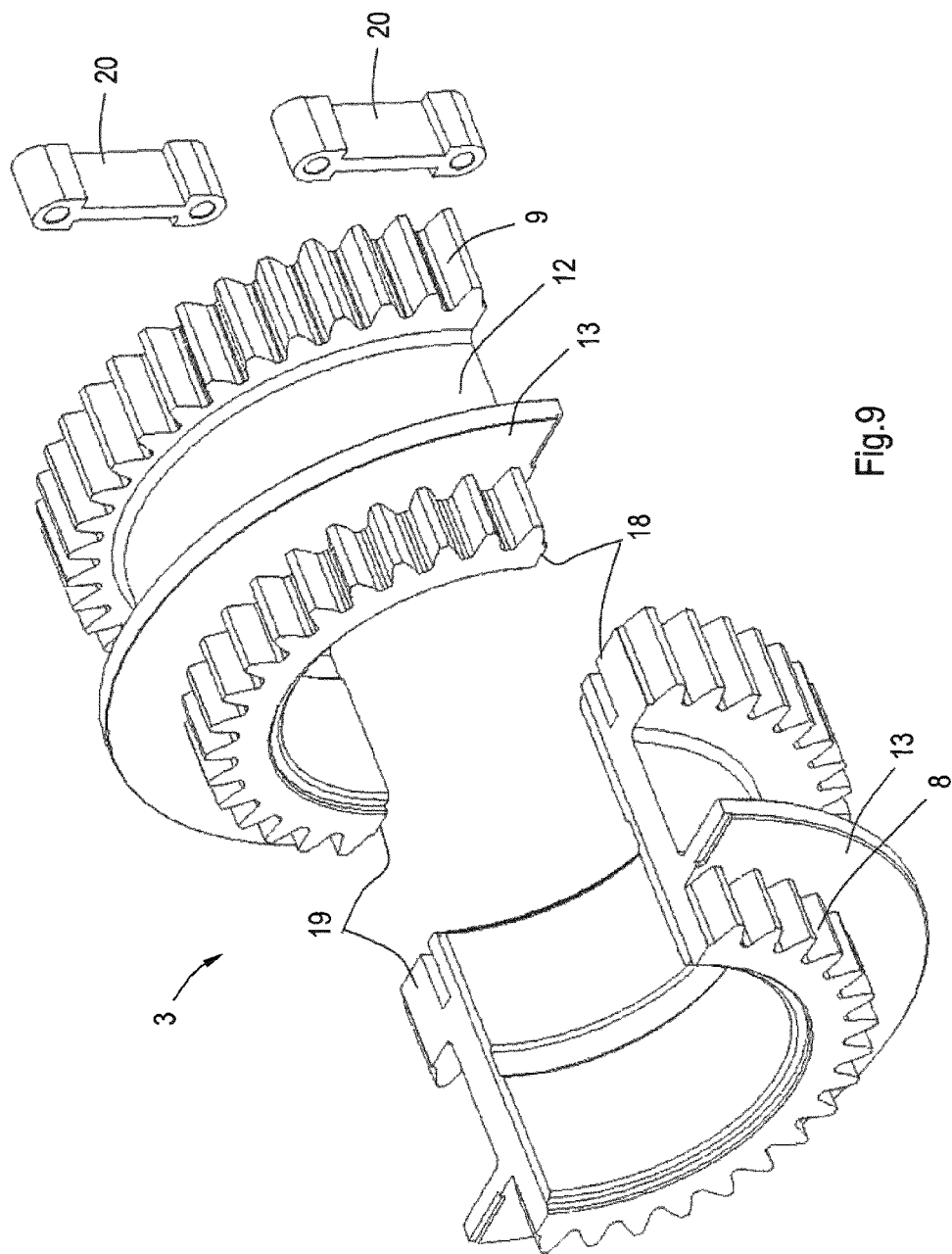

FIG. 8 shows an embodiment of the first crank member 3 in more detail and FIG. 9 shows the first crank member 3 before assembling. In the condition as shown in FIG. 9 there are two halves of the first crank member 3. Upon assembly of the crankshaft 1 and the first crank member 3 both halves are fitted to each other about the crankpin 5. Similar to the second crank member 4 as described hereinbefore, two contact faces 18, 19 are created at opposite sides of the crankpin 5. The contact faces 18, 19 extend between opposite axial outer sides of the crank member 4, in this case between the rear surface of the rear crank member gear 9 and the front surfaces of the flange 13 and the front crank member gear 8. It is noted that since the flange 13 is located between the front crank member gear 8 and the bearing portion 12 and extends beyond the outer circumference of the front crank member gear 8, the front side of the first crank member 3 is not a flat plane. Similar to the second crank member 4, the halves of the first crank member 3 may be provided with centring elements at the contact faces 18, 19 in order to facilitate fitting the halves to each other and to lock the halves in radial and axial direction of the crankpin 5.

FIG. 9 shows that at a rear side of the first crank member 3 the halves are fixed to each other by means of similar I-shaped locking members 20 as described hereinbefore.

At a front side of the first crank member 3 there are two fixing places 22 which are located at the contact faces 18, 19 at the flange 13. Also in this case the fixing places 22 are located remote from the bearing portion 12 and the toothed surfaces of the front and rear crank member gears 8, 9. The halves are not fixed to each other in circumferential direction at the bearing portion 12 and the toothed surfaces of the front and rear crank member gears 8, 9, although centring elements may be present at the contact faces 18, 19.

The advantage of this embodiment of the first crank member 4 is that a relatively small front crank member gear 8 can be applied. As shown in FIGS. 8 and 9 the diameter of the front crank member gear 8 is smaller than the diameter of the rear crank member gear 9. The smaller diameter is desired in order to package the intermediate gears 10 and the auxiliary gear in a flat plane between the bearing portion 12 and the adjacent crank arm 6 as shown in FIG. 3.

FIG. 8 shows that the side wall of the front crank member gear 8 may be too small to apply a fixation in the form of an I-shaped locking member in a recess. Due to welding the halves of the first crank member 3 at the fixing places 22 of the circular flange 13, the halves at the front crank member gear 8 are also fixed to each other in circumferential direction. The method of assembling of the first crank member 3 corresponds to the method of assembling of the second crank member 4 in that the first crank member 3 can be rotated about the crankpin 5 until the fixing places 22 are located beyond the crank arms 6 as seen in radial direction from the crankpin axis 7.

It is noted that the fixing places 22 of the flange 13 may also be located at opposite side if there is sufficient space for placing a welding tool, since the flange 13 extends beyond the outer circumference of the bearing portion 12 and the rear crank member gear 9. It is also conceivable that the fixing places 22 for welding are located at opposite side of the flange 13.

It is also conceivable that the first crank member 3 is identical to the second crank member 4. This means that the diameter of the front crank member gear 8 is relatively large, which results in a long-stroke reciprocating piston mechanism.

Figure 10:
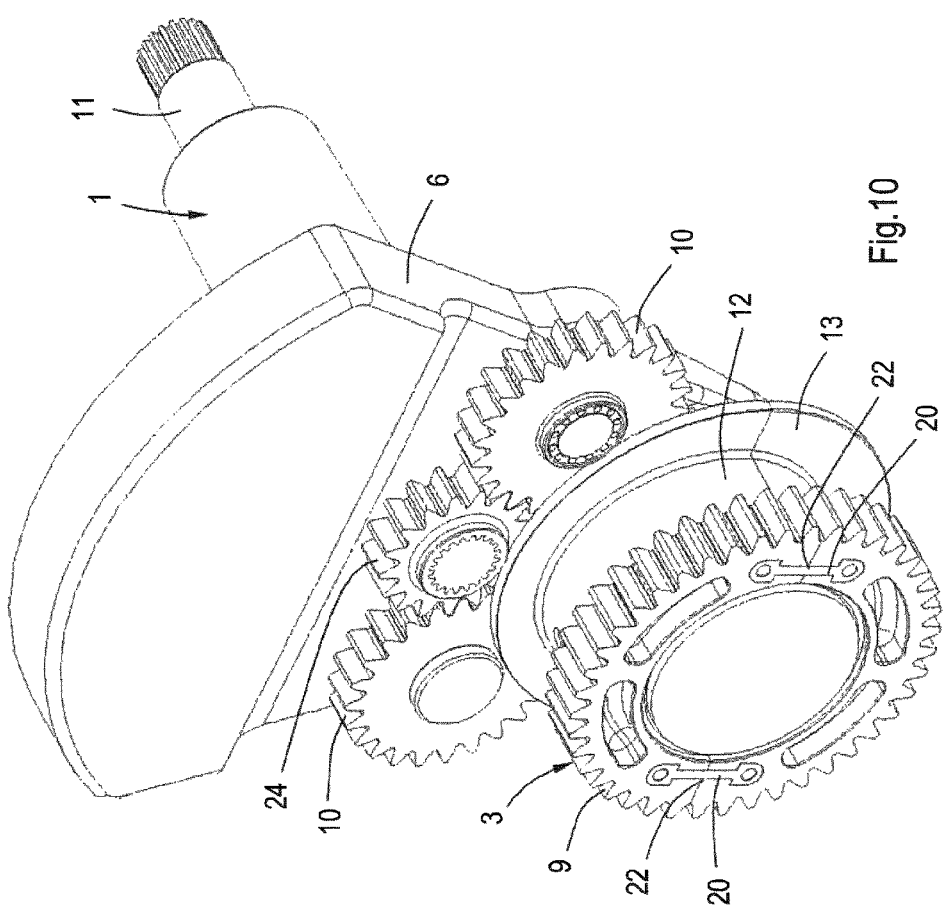
FIG. 10 is an enlarged view of a part of FIG. 3.

FIG. 10 shows a part of the crankshaft 1 and the first crank member 3 of FIG. 3. This figure shows that the front crank member gear 8 meshes with two intermediate gears 10, whereas the intermediate gears 10 mesh with an auxiliary gear 24 that is fixed to the auxiliary shaft 11. At one of the intermediate gears 10 a cover is removed from the corresponding shaft showing a needle bearing. In order to provide sufficient supporting force between the auxiliary gear 24 and the auxiliary shaft 14, and between the intermediate gears 10 and their respective shafts, the auxiliary gear 24 and the intermediate gears 10 are provided with circumferential extensions at their shafts protruding in axial direction. This means that the needle bearings at the intermediate gears 10 are relatively long and a splined end portion of the auxiliary shaft 11 at the auxiliary gear 24 is relatively long.

FIG. 10 also illustrates an additional advantage of the presence of the circular flange 13 at the first crank member 3, since the flange 13 functions as a blocking ring for keeping the intermediate gears 10 and the auxiliary gear 24 in place. The outer diameter of the flange 13 is selected such that the shafts and possible covers at the intermediate gears 10 and the auxiliary gear 24 may overlap the flange 13 in axial direction. It is noted that the presence of the flange 13 between the bearing portion 12 and the front crank member gear 8 does not depend on the way of assembling the first crank member 3 in two halves. In other words, the circular flange 13 is dimensioned such that it blocks at least an intermediate gear 10 and/or the auxiliary gear 24 in axial direction. It could even be used in case of a crank member which is made of one piece.

Figure 11:
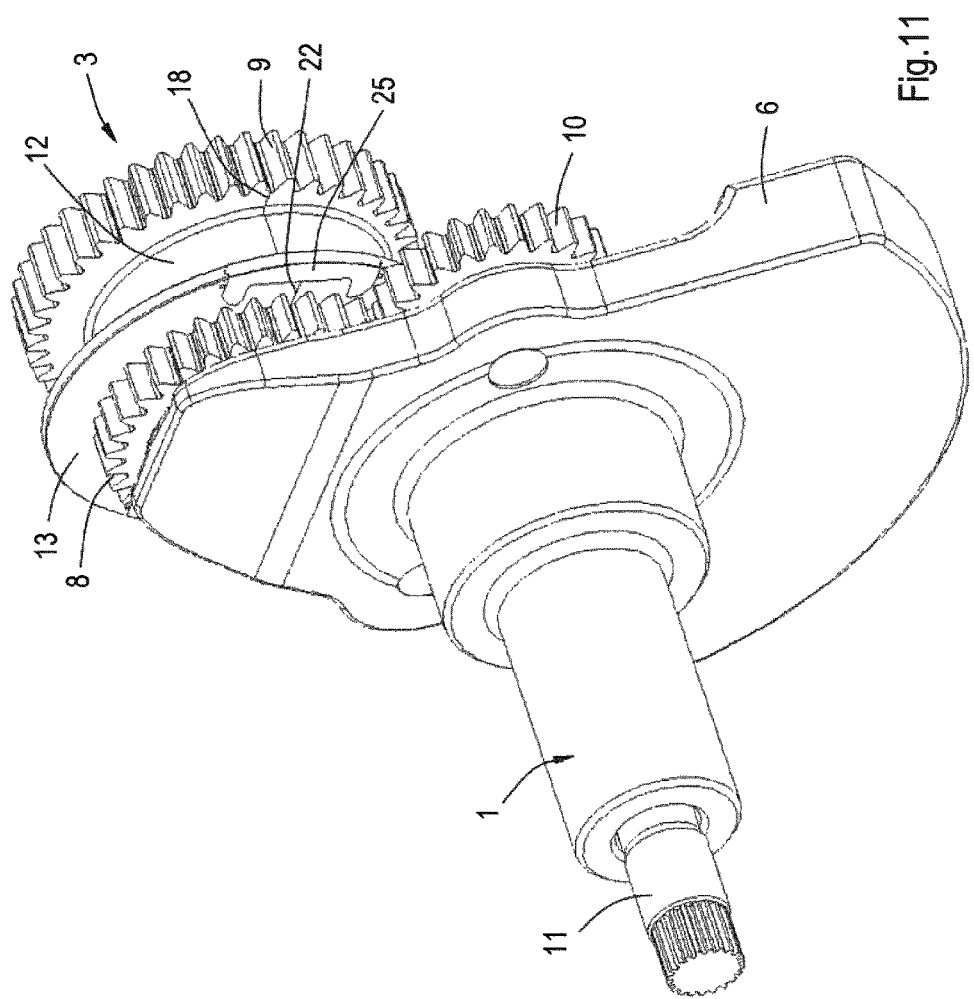
FIGS. 11 and 12 are similar views as FIG. 10, but showing an alternative embodiment of the first crank member as seen from different sides.
Figure 12:
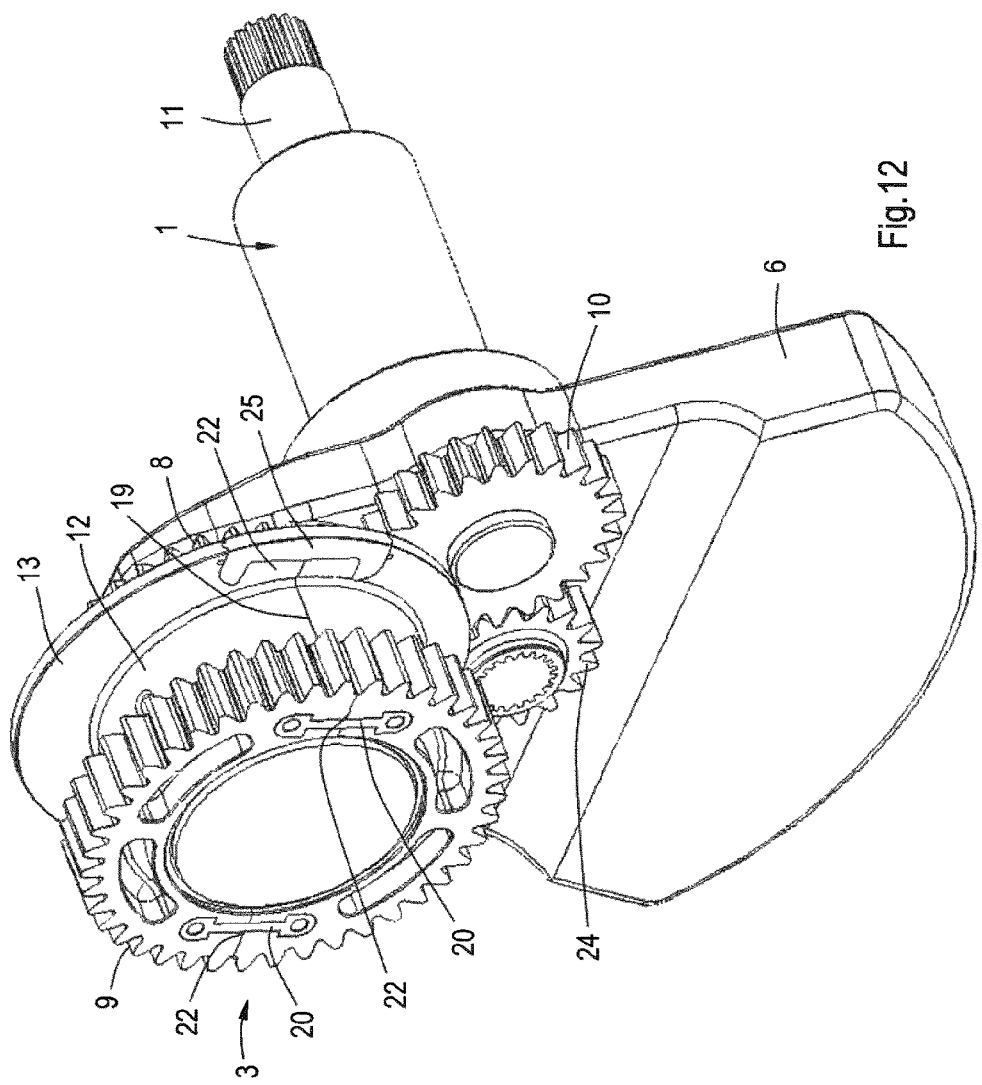

FIGS. 11 and 12 show an alternative embodiment of the first crank member 3. This embodiment is nearly identical to the embodiment as shown in FIGS. 8-10, except the way of fixing the halves of the first crank member 3 at the circular flange 13. In this embodiment the flange 13 is provided with locking members 25 which are pressed in radial direction to the crankpin axis 7 in common recesses of the flange 13 at the contact faces 18, 19. The locking members 25 and the complementary recesses may be shaped such that the halves of the flange 13 are pressed to each other upon assembly, for example tapered. In spite of the fact that the fixation is applied at a fixing place 22 that is located at a radial outer side rather than an axial outer side of the first crank member 3, the fixing places 22 at the flange 13 are located remote from the bearing portion 12 and the toothed surfaces of the front and rear crank member gears 8, 9. It is not necessary to fix the halves to each other in circumferential direction at the bearing portion 12 and the toothed surfaces of the front and rear crank member gears 8, 9, although centring elements may be present at the contact faces 18, 19 for axial and radial locking of the halves.

Alternative means for fixing the halves of the first crank member 3 to each other in circumferential direction at the flange 13 are conceivable, for example an enveloping clamping strip about the flange 13.

Figure 13:
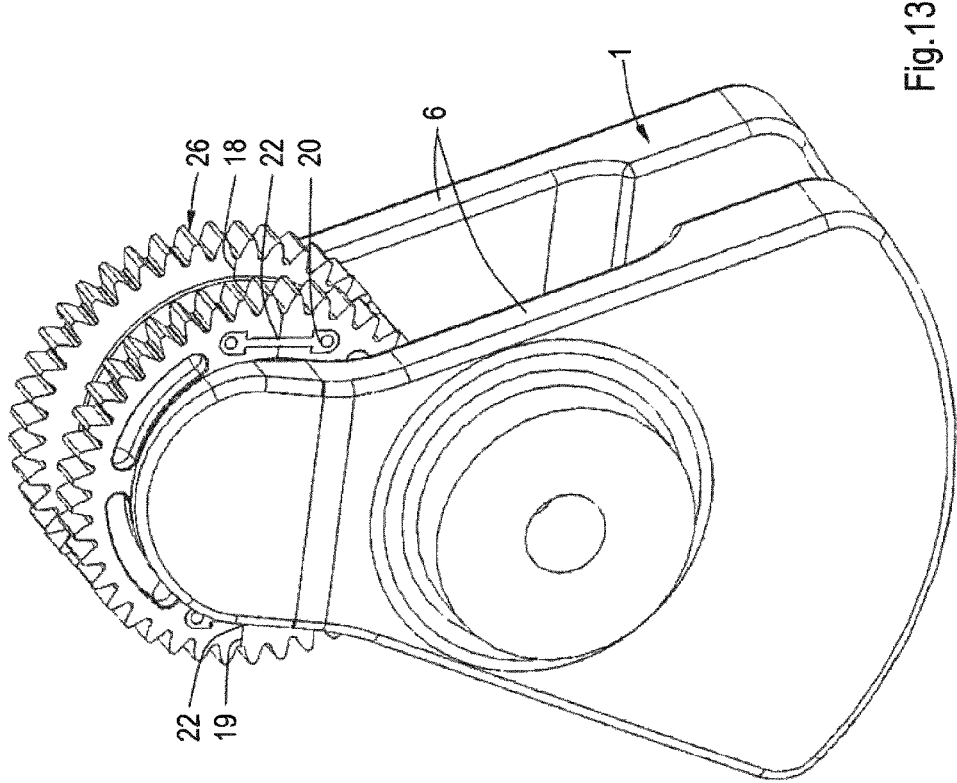
FIG. 13 is a perspective view of a part of an assembled alternative crankshaft and crank member according to an embodiment of the invention.

FIG. 13 shows a part of an alternative embodiment of a crankshaft 1. The embodiment of the crank member 26 is comparable with the second crank member 4 as shown in FIG. 3. In this embodiment each of the axial outer sides of the crank member 26 has two fixing places 22 at the opposite contact faces 18, 19, such that the fixing places 22 are located at opposite sides of the crankpin 5, whereas the adjacent crank arms 6 are shaped such that at a certain rotational position of the crank member 26 all four fixing places 22 lie outside the adjacent crank arms 6 in radial direction of the crankpin axis. FIG. 13 illustrates that in the shown condition two fixing places 22 at one axial outer side of the crank member 26 are located beyond the adjacent crank arm 6 as seen in radial direction of the crankpin 5. This means that at both axial outer sides of the crank member 26 in total four locking members 20 can be inserted simultaneously which reduces assembling time dramatically. Alternative types of fixations, such as welding, instead of I-shaped locking members are conceivable, as well.

Figure 14:
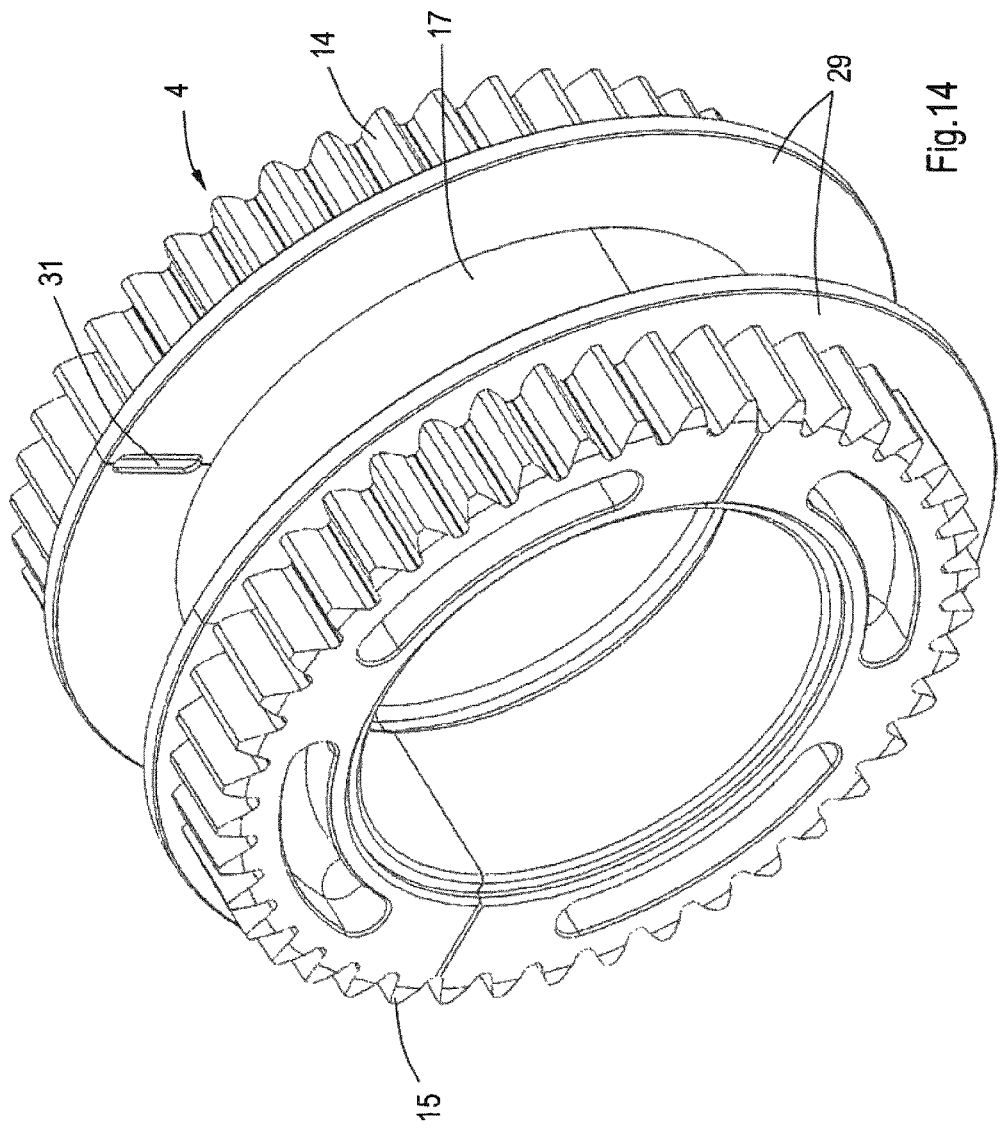
FIGS. 14 and 15 are similar views as FIGS. 4 and 5, respectively, but showing an alternative embodiment of the second crank member.
Figure 15:
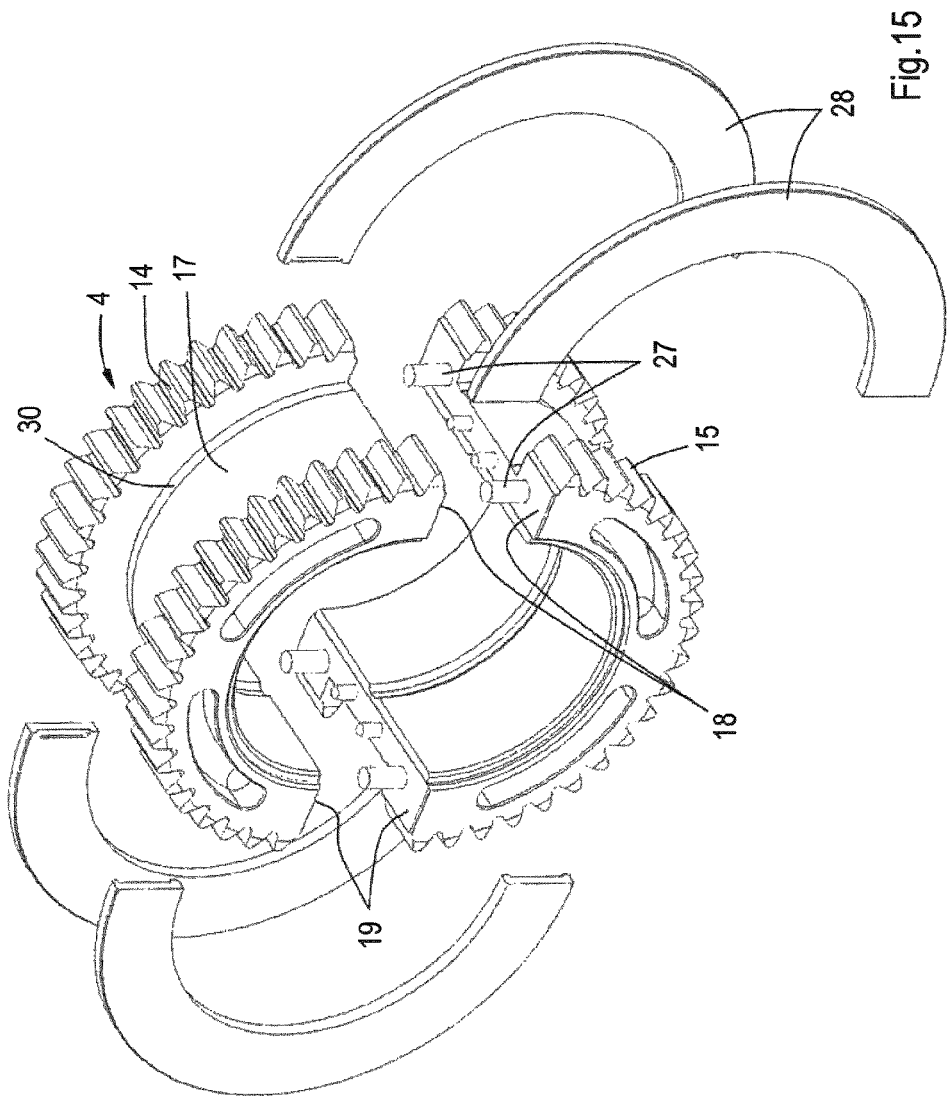

FIGS. 14 and 15 show an alternative embodiment of the second crank member 4. This embodiment is also provided with front and rear crank member gears 14, 15 and the bearing portion 17. FIG. 15 shows that the halves of the second crank member 4 are provided with centring elements 27 at the contact faces for fixing the halves to each other in axial and radial direction of the crank member 4. In the embodiment as shown in FIGS. 14 and 15 the halves are fitted to each other about the crankpin 5, after which four halve flanges 28 are fitted about the halves of the second crank member 4, two of them between the front crank member gear 14 and the bearing portion 17, on the one hand, and two of them between the rear crank member gear 15 and the bearing portion 17, on the other hand. After fitting, the halve flanges 28 form two common flanges 29. The flanges 29 are received by complementary circumferential slots 30 between the bearing portion 17 and each of the front and rear crank member gears 14, 15 so as to lock the flanges 29 in axial direction. FIG. 14 shows that the fixation in this embodiment comprises flanges 29 which are not located at the bearing portion 17 and the toothed surface of the front and rear crank member gears 14, 15. It is noted that the fixing places in this embodiment are located between the bearing portion 17 and the rear crank member gear 15, and between the bearing portion 17 and the front crank member gear 14. The applied fixation comprises welding of the flange halves 28 at welding locations 31. In the embodiment as shown, the welding locations 31 are not located at the axial outer sides of the second crank member 4, but on sides of the flanges 29 which face to each other. Furthermore, the welding locations 31 are located remote from the contact faces 18, 19, in this case at substantially 90° about the crankpin axis from the contact faces 18, 19. In order to avoid local protrusions of welding seams, recesses are present at the welding locations 31 such that the welding seams may fill the respective recesses. The method of assembling may be performed in a similar way as described before. The welding locations 31 in the embodiments as shown in FIG. 14 may be located at different rotational positions with respect to the second crank member 4, for example at the contact faces 18, 19 or at an angle of 90° with respect to the contact faces 18, 19. The welding locations 31 may also be located at the axial outer sides of the flanges 29 if the flanges 29 extend beyond the front and rear crank member gears 14, 15 in radial direction.

Figure 16:
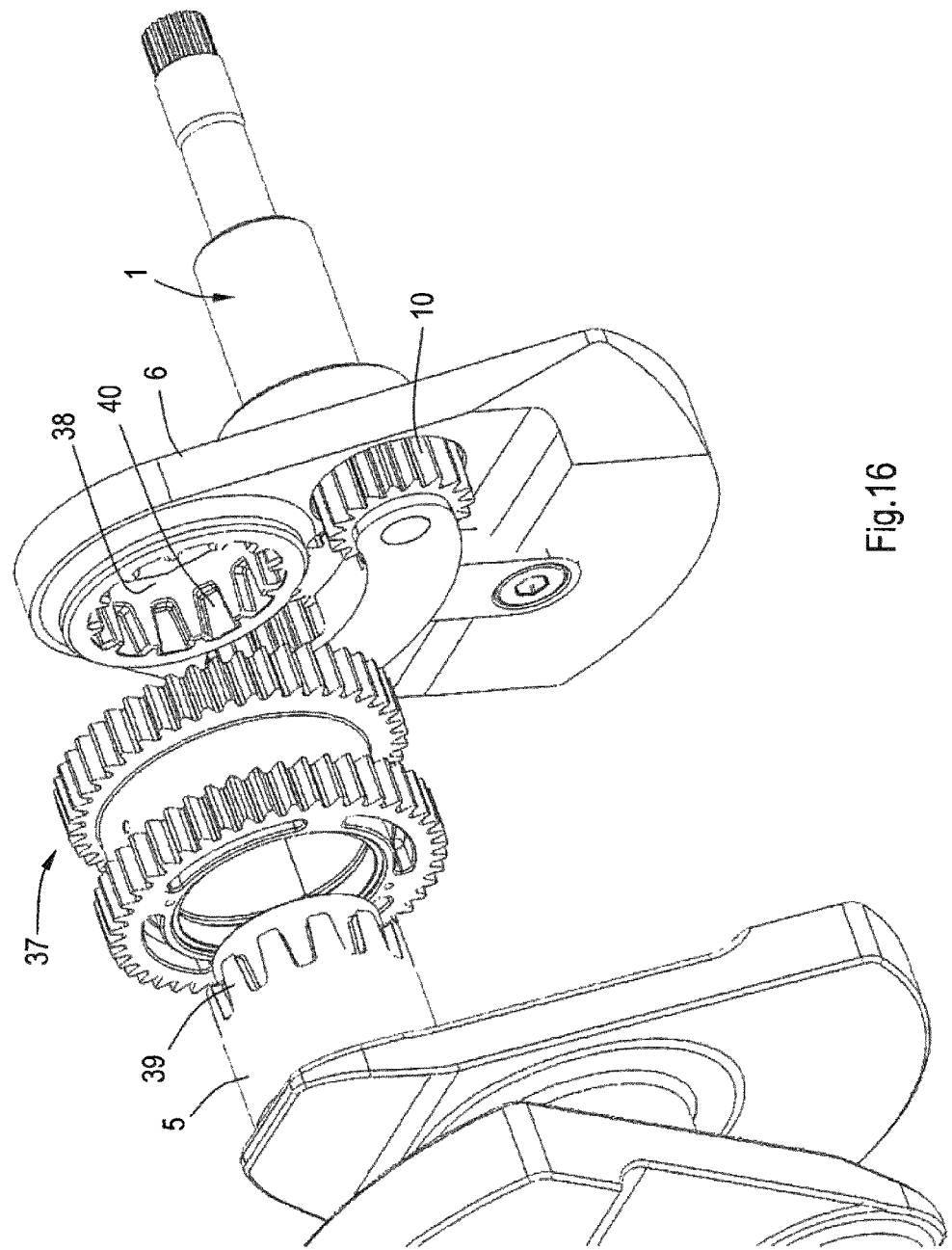
FIG. 16 is a perspective view of a part of an alternative crankshaft and a first crank member as a single part before assembling.

Referring to FIG. 3, it is conceivable that the first crank member 3 is not applied to the crankshaft 1 as two halves, but as a single piece, whereas the associated part of the crankshaft 1 is composed of separate parts. The crankshaft part may comprise a press connection as illustrated in FIG. 16. The first crank member 37 is supplied as a single piece and fit about the crankpin 5 by means of sliding it over the crankpin 5 in axial direction thereof. FIG. 16 also illustrates that in this case the intermediate gears 10 are partly located in recesses in the crank arm 6, hence making the mechanism compact in axial direction. These recesses can be made relatively easy due to the fact that the crank arm 6 is separate from the adjacent crankpin 5 before assembly.

In the press connection as shown in FIG. 16 the free end of the crankpin 5 and the inner wall of a receiving hole 38 in the cooperating crank arm 6 have complementary tapered ridges 39 and recesses 40. In assembled condition the press connection appears to be rigid in rotational direction of the crankshaft 1. Additionally, the free end of the crankpin 5 may be laser welded along its circumference to the crank arm 6 at the side of the crank arm 6 opposite to the first crank member 37. Preferably, laser welding is performed after pressing the crankpin 5 into the crank arm 6, but before relieving pressure. Alternatively, a tapered element may be pressed into a central recess in the free end of the crankpin 5 so as to press the crankpin 5 stronger in the receiving hole 38. This facilitates disassembling the first crank member 37 and the crankshaft 1.

It is noted that the press fit as illustrated in FIG. 16 is not limited to this embodiment. In other words, an innovative method of assembling a crankshaft and a crank member comprises the steps of supplying a first crankshaft part including a first crank arm and a crankpin, a crank member and a second crankshaft part including a second crank arm having a through-hole for receiving the crankpin, wherein the crank member is fit about the crankpin, after which the crankpin is pressed into the through-hole of the second crank arm, after which the crankpin is welded to the second crank arm at the side of the second crank arm which is direct away from the first crank arm. Preferably, the welding is performed before relieving the pressure.

From the foregoing, it will be clear that the invention provides an appropriate method of assembling a crankshaft and a crank member, in which the crankshaft is a single piece and the crank member is composed of two halves.

The invention is not limited to the embodiments shown in the drawings and described hereinbefore, which may be varied in different manners within the scope of the claims and their technical equivalents. For example, the method is also applicable for crankshafts of V-engines which may have two eccentrical bearing portions per crank member, wherein the maximum eccentricity of both bearing portions can be angled with respect to each other about the crankpin axis.

The invention claimed is:

1. A method of assembling a crankshaft and a crank member, comprising:
   providing a crankshaft including a crankpin which extends between crank arms, wherein the crankshaft has a crankshaft axis and the crankpin has a crankpin axis,
   fixing two halves of a crank member to each other about the crankpin such that in assembled condition the crank member is rotatable about the crankpin and comprises a bearing portion having an outer circumferential wall for bearing a big end of a connecting rod and an external crank member gear configured to drive the crank member about the crankpin,
   fitting the halves to each other about the crankpin, hence creating two contact faces at opposite sides of the crankpin and extending between opposite axial outer sides of the crank member, after which both halves are fixed to each other in circumferential direction by a fixation at a fixing place located remote from the bearing portion and a toothed surface of the crank member gear,
   wherein the fixing place is located at an axial outer side of the crank member at at least one contact face,
   wherein the fixation comprises inserting an I-shaped locking member into recesses of the halves at the fixing place, and
   wherein the recesses form a common recess into which the locking member is inserted in an axial direction of the crankshaft.

2. The method according to claim 1, wherein a rotational position of the crank member with respect to the crankpin is selected such that the fixing place lies beyond one of the adjacent crank arms as seen in a radial direction from the crankpin axis before applying the fixation.

3. The method according to claim 2, wherein the fixing place substantially lies in a plane in which both the crankshaft axis and the crankpin axis extend.

4. The method according to claim 1, wherein the locking member and the recesses are shaped such that the locking member is inserted by means of pressing, causing the halves to be pressed to each other at the same time.

5. The method of claim 4, wherein the locking member is tapered.

6. The method according to claim 1, wherein before the step of inserting the locking member, determining dimensions of the recesses, wherein a complementary locking member is selected out of a series of locking members having different dimensions, wherein the selection of the complementary locking member is based on a predetermined desired relationship between dimensions of the recesses and the complementary locking member.

7. The method according to claim 1, wherein after applying the fixation at the fixing place, rotating the crank member about the crankpin such that the other contact face at said axial outer side of the crank member lies beyond one of the adjacent crank arms in a radial direction as seen from the crankpin axis, after which the method includes applying a second fixation at the other contact face at said axial outer side of the crank member.

8. The method of claim 1, wherein the locking member is inserted into the recesses and shrinked.

9. The method of claim 1, wherein a stem of a locking member is straight between its opposite ends.

10. The method of claim 9, wherein each of the opposite ends has two protrusions facing in opposite directions away from the stem.

* * * * *